US012122890B2

(12) United States Patent
Wagner et al.

(10) Patent No.: US 12,122,890 B2
(45) Date of Patent: Oct. 22, 2024

(54) PRODUCTION OF POLYURETHANE FOAM

(71) Applicant: Evonik Operations GmbH, Essen (DE)

(72) Inventors: Michael Wagner, Recklinghausen (DE); Carsten Schiller, Ratingen (DE); Michael Ferenz, Essen (DE); Sarah Otto, Essen (DE); Sabine Kömmelt, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 299 days.

(21) Appl. No.: 17/391,664

(22) Filed: Aug. 2, 2021

(65) Prior Publication Data

US 2022/0056231 A1    Feb. 24, 2022

(30) Foreign Application Priority Data

Aug. 20, 2020    (EP) ..................................... 20191881

(51) Int. Cl.
*C08J 9/12*      (2006.01)
*C08J 9/00*      (2006.01)
*C08J 9/14*      (2006.01)
*C08L 75/06*     (2006.01)

(52) U.S. Cl.
CPC ........... *C08J 9/0061* (2013.01); *C08J 9/0038* (2013.01); *C08J 9/125* (2013.01); *C08J 9/127* (2013.01); *C08J 9/141* (2013.01); *C08L 75/06* (2013.01); *C08J 2203/10* (2013.01); *C08J 2203/14* (2013.01); *C08J 2203/202* (2013.01); *C08J 2205/10* (2013.01); *C08J 2375/06* (2013.01); *C08L 2203/14* (2013.01); *C08L 2205/03* (2013.01)

(58) Field of Classification Search
CPC ........ C08F 4/34; C08F 220/286; C08G 18/14; C08G 18/3203; C08G 18/40; C08G 18/42; C08G 18/4208; C08G 18/4829; C08G 18/672; C08G 18/755; C08G 18/7664; C08G 18/8175; C08G 2101/00; C08G 2110/0025; C08J 9/0038; C08J 9/0061; C08J 9/125; C08J 9/127; C08J 9/14; C08J 9/141; C08J 9/142; C08J 9/145; C08J 9/146; C08J 9/149; C08J 2203/10; C08J 2203/14; C08J 2203/202; C08J 2205/10; C08J 2375/04; C08J 2375/06; C08J 2433/10; C08J 2475/04; C08J 2475/06; C08J 2475/08; C08L 75/06; C08L 75/08; C08L 2203/14; C08L 2205/03

See application file for complete search history.

(56) References Cited

U.S. PATENT DOCUMENTS

| | | | |
|---|---|---|---|
| 3,900,424 A | 8/1975 | Inoue et al. | |
| 3,953,383 A | 4/1976 | Inoue et al. | |
| 4,478,957 A | 10/1984 | Klietsch et al. | |
| 4,500,704 A | 2/1985 | Kruper et al. | |
| 5,668,187 A | 9/1997 | Asako et al. | |
| 5,844,010 A | 12/1998 | Burkhart et al. | |
| 5,990,187 A | 11/1999 | Boinowitz et al. | |
| 7,671,104 B2 | 3/2010 | Heinemann et al. | |
| 8,030,366 B2 | 10/2011 | Ferenz et al. | |
| 8,247,467 B2 | 8/2012 | Mijolovic et al. | |
| 8,349,907 B2 | 1/2013 | Henning et al. | |
| 8,623,984 B2 | 1/2014 | Henning et al. | |
| 8,802,744 B2 | 8/2014 | Knott et al. | |
| 8,906,974 B2 | 12/2014 | Glos et al. | |
| 8,946,310 B2 | 2/2015 | Glos et al. | |
| 8,946,311 B2 | 2/2015 | Schiller et al. | |
| 8,946,369 B2 | 2/2015 | Henning et al. | |
| 8,957,121 B2 | 2/2015 | Schiller et al. | |
| 9,035,011 B2 | 5/2015 | Ferenz et al. | |
| 9,315,614 B2 | 4/2016 | Schubert et al. | |
| 9,328,210 B2 | 5/2016 | Terheiden et al. | |
| 9,334,354 B2 | 5/2016 | Ferenz et al. | |
| 9,349,500 B2 | 5/2016 | Koemmelt et al. | |
| 9,540,500 B2 | 1/2017 | Ferenz et al. | |
| 9,657,144 B2 | 5/2017 | Hubel et al. | |
| 10,023,679 B2 | 7/2018 | Klostermann et al. | |
| 10,189,965 B2 | 1/2019 | Krebs et al. | |
| 10,787,464 B2 | 9/2020 | Fiedel et al. | |
| 10,870,723 B2 | 12/2020 | Glos | |

(Continued)

FOREIGN PATENT DOCUMENTS

| | | |
|---|---|---|
| CN | 103044687 | 4/2013 |
| CN | 103055759 | 4/2013 |

(Continued)

OTHER PUBLICATIONS

Ferenz et al., U.S. Appl. No. 17/523,059, filed Nov. 10, 2021.
European Search Report mailed on Feb. 2, 2021 in EP 20191881.0 (8 pages).

*Primary Examiner* — John M Cooney
(74) *Attorney, Agent, or Firm* — Grüneberg and Myers PLLC

(57) ABSTRACT

Compositions for producing a rigid polyurethane foam are described, comprising at least one isocyanate component, a polyol component, optionally a catalyst which catalyzes the formation of a urethane or isocyanurate bond, wherein the composition has hydrocarbons having 3, 4 or 5 carbon atoms, hydrofluorocarbons, hydrofluoroolefins (HFO), hydrohaloolefins, oxygen-containing blowing agents and/or chlorohydrocarbons as blowing agent, and also comprises acrylate and/or methacrylate copolymers as foam stabilizers.

17 Claims, No Drawings

(56) References Cited

U.S. PATENT DOCUMENTS

| | | |
|---|---|---|
| 2002/0103091 A1 | 8/2002 | Kodali |
| 2002/0132867 A1 | 9/2002 | Borgogelli et al. |
| 2005/0075468 A1 | 4/2005 | Knott et al. |
| 2006/0167125 A1 | 7/2006 | Bauer et al. |
| 2006/0229375 A1 | 10/2006 | Hsiao et al. |
| 2006/0293400 A1 | 12/2006 | Wiltz et al. |
| 2007/0021581 A1 | 1/2007 | Eilbracht et al. |
| 2007/0072951 A1 | 3/2007 | Bender et al. |
| 2007/0270518 A1 | 11/2007 | Nutzel |
| 2008/0125503 A1 | 5/2008 | Henning et al. |
| 2010/0036011 A1 | 2/2010 | De Gans et al. |
| 2011/0062370 A1 | 3/2011 | Eilbracht et al. |
| 2011/0230619 A1 | 9/2011 | Kuppert et al. |
| 2012/0004334 A1* | 1/2012 | Kramer .............. C08G 18/4219 521/88 |
| 2012/0153210 A1 | 6/2012 | Glos et al. |
| 2012/0190760 A1 | 7/2012 | Henning et al. |
| 2012/0190762 A1 | 7/2012 | Hubel et al. |
| 2013/0035407 A1 | 2/2013 | Lobert et al. |
| 2013/0068990 A1 | 3/2013 | Eilbracht et al. |
| 2013/0213267 A1 | 8/2013 | Fiedel et al. |
| 2013/0345318 A1 | 12/2013 | Schubert et al. |
| 2015/0057384 A1 | 2/2015 | Glos et al. |
| 2016/0096939 A1 | 4/2016 | Glos et al. |
| 2016/0152739 A1 | 6/2016 | Eilbracht et al. |
| 2018/0327563 A1 | 11/2018 | Klostermann et al. |
| 2019/0233571 A1 | 8/2019 | Diendorf et al. |
| 2020/0239621 A1 | 7/2020 | Glos |
| 2020/0377684 A1 | 12/2020 | Hermann et al. |
| 2021/0047474 A1 | 2/2021 | Klostermann et al. |
| 2021/0137276 A1 | 5/2021 | Landers et al. |
| 2021/0380774 A1 | 12/2021 | Wagner et al. |
| 2022/0017679 A1 | 1/2022 | Glos et al. |
| 2022/0041829 A1 | 2/2022 | Glos et al. |

FOREIGN PATENT DOCUMENTS

| | | |
|---|---|---|
| CN | 103657518 | 3/2014 |
| CN | 103665385 | 3/2014 |
| DE | 3234462 C1 | 1/1984 |
| DE | 38 24 355 A1 | 1/1990 |
| EP | 0275563 | 7/1988 |
| EP | 0 533 202 A1 | 3/1993 |
| EP | 0 570 174 B1 | 2/1996 |
| EP | 0867464 | 9/1998 |
| EP | 0867465 | 9/1998 |
| EP | 1 070 730 A2 | 1/2001 |
| EP | 1 161 474 A1 | 12/2001 |
| EP | 0 877 045 B1 | 1/2002 |
| EP | 1211279 | 6/2002 |
| EP | 1520870 | 4/2005 |
| EP | 1 544 235 A1 | 6/2005 |
| EP | 1 678 232 A2 | 7/2006 |
| EP | 1 712 578 A1 | 10/2006 |
| EP | 1 873 209 A2 | 1/2008 |
| EP | 2 465 891 A1 | 6/2012 |
| EP | 2 465 892 A1 | 6/2012 |
| EP | 3 173 205 A1 | 5/2017 |
| WO | 00/47647 A1 | 8/2000 |
| WO | 00/58383 A1 | 10/2000 |
| WO | 2004/020497 A1 | 3/2004 |
| WO | 2004/096882 A1 | 11/2004 |
| WO | 2005/033167 A2 | 4/2005 |
| WO | 2005/085310 A2 | 9/2005 |
| WO | 2006/094227 A2 | 9/2006 |
| WO | 2006/116456 A1 | 11/2006 |
| WO | 2008/058913 A1 | 5/2008 |
| WO | 2009/058367 A1 | 5/2009 |
| WO | 2009/130470 A1 | 10/2009 |
| WO | 2010/028362 A1 | 3/2010 |
| WO | 2011/163133 A1 | 12/2011 |
| WO | 2013/022932 A1 | 2/2013 |
| WO | 2013/156237 A2 | 10/2013 |
| WO | 2021/069164 A1 | 4/2021 |
| WO | 2021/165149 A1 | 8/2021 |
| WO | 2021/212317 A1 | 10/2021 |
| WO | 2022/122360 A1 | 6/2022 |

* cited by examiner

PRODUCTION OF POLYURETHANE FOAM

CROSS REFERENCE TO RELATED APPLICATIONS

This application is a 35 U.S.C. § 119 patent application which claims the benefit of European Application No. 20191881.0 filed Aug. 20, 2020, which is incorporated herein by reference in its entirety.

FIELD

The present invention is in the field of polyurethane foams. In particular, it relates to the production of rigid polyurethane foams using particular blowing agents and also acrylate and/or methacrylate copolymers as foam stabilizer. It further relates to corresponding compositions, and to the use of the foams that have been produced in accordance with the invention. The polyurethane foams are especially rigid polyurethane foams.

BACKGROUND

Polyurethane (PU) in the context of the present invention is especially understood as meaning a product obtainable by reaction of polyisocyanates and polyols or compounds having isocyanate-reactive groups. Further functional groups in addition to the polyurethane may also be formed in the reaction, examples being uretdiones, carbodiimides, isocyanurates, allophanates, biurets, ureas and/or uretonimines. Therefore, PU is understood for the purposes of the present invention as meaning not just polyurethane, but also polyisocyanurate, polyureas, and polyisocyanate reaction products containing uretdione, carbodiimide, allophanate, biuret and uretonimine groups. In the context of the present invention, polyurethane foam (PU foam) is understood as meaning foam that is obtained as reaction product based on polyisocyanates and polyols or compounds having isocyanate-reactive groups. In addition to the eponymous polyurethane, further functional groups can be formed as well, examples being allophanates, biurets, ureas, carbodiimides, uretdiones, isocyanurates or uretonimines. The most preferred foams in the context of the present invention are rigid polyurethane foams.

Polyurethane and polyisocyanurate foams, especially corresponding rigid foams, are produced using cell-stabilizing or foam-stabilizing additives to ensure a fine-celled, uniform and low-defect foam structure and hence to exert an essentially positive influence on the performance characteristics, for example the thermal insulation performance in particular, of the rigid foam. Surfactants based on polyether-modified siloxanes are particularly effective and therefore represent the preferred type of foam stabilizers.

Various publications relating to the use of siloxane-based additives have already been published. Usually, polyether-siloxane foam stabilizers (PES) are used here.

EP 0 570 174 B1 describes polyethersiloxanes suitable for the production of rigid polyurethane foams using organic blowing agents, particularly chlorofluorocarbons such as CFC-11.

EP 0 533 202 A1 describes polyethersiloxanes that bear SiC-bonded polyalkylene oxide radicals and are suitable as blowing agent in the case of use of hydrochlorofluorocarbons, for example HCFC-123.

EP 0 877 045 B1 describes analogous structures for this production process which differ from the former foam stabilizers in that they have a comparatively higher molecular weight and have a combination of two polyether substituents on the siloxane chain.

EP1544235 describes typical polyether-modified siloxanes for rigid PU foam applications. Siloxanes having 60 to 130 silicon atoms and different polyether substituents R, the mixed molar mass of which is 450 to 1000 g/mol and the ethylene oxide content of which is 70 to 100 mol %, are used here.

CN103055759 describes polyether-modified siloxanes that bring about improved cell opening. At least 18 silicon units are present in the siloxane, and various types of side chains are used for modification.

EP 1873209 describes polyether-modified siloxanes for production of rigid PU foams having improved fire properties. Here there are 10 to 45 silicon atoms in the siloxanes, and the polyether side chains consist to an extent of at least 90% of ethylene oxide units.

EP 2465891 A1 describes polyether-modified siloxanes in which some of the polyether side chains bear OH groups. The siloxanes here contain at least 10 silicon atoms.

EP 2465892 A1 describes polyether-modified siloxanes in which the polyether side chains bear mainly secondary OH end groups, where the siloxanes here too contain at least 10 silicon atoms.

DE 3234462 describes siloxanes for use in flexible foam, especially moulded flexible foam. There are descriptions here of combinations of polyether-modified siloxanes (PES) and polydimethylsiloxanes, where the PES contain 4 to 15 silicon units.

SUMMARY

Nevertheless, there is still a need for further foam stabilizers for PU foam, preferably for rigid PU foam, and especially for those foam stabilizers that fundamentally enable siloxane-free foam stabilization.

The specific object of the present invention was thus to enable the provision of rigid PU foams, wherein it is fundamentally possible to achieve siloxane-free foam stabilization.

DETAILED DESCRIPTION

Surprisingly, it has now been found that by the combined use of particular blowing agents and acrylate and/or methacrylate copolymers as foam stabilizers, it is possible to produce rigid PU foams in impeccable quality. The blowing agents that may be used according to the invention are hydrocarbons having 3, 4 or 5 carbon atoms, hydrofluorocarbons, hydrofluoroolefins (HFO), hydrohaloolefins, oxygen-containing blowing agents and/or chlorohydrocarbons.

The combination according to the invention of blowing agents and acrylate and/or methacrylate copolymers as foam stabilizers fundamentally enables siloxane-free foam stabilization, i.e. it enables dispensing entirely with siloxane-based additives, such as the known polyether siloxane foam stabilizers. However, they also permit joint use with the siloxane-containing stabilizers known from the prior art. Both are encompassed by the present invention.

Against this background, the invention relates to a composition for producing a rigid polyurethane foam, comprising at least one isocyanate component, a polyol component, optionally a catalyst which catalyzes the formation of a urethane or isocyanurate bond, wherein the composition has hydrocarbons having 3, 4 or 5 carbon atoms, hydrofluorocarbons, hydrofluoroolefins (HFO), hydrohaloolefins, oxygen-containing blowing agents and/or chlorohydrocarbons as blowing agent, and also comprises acrylate and/or methacrylate copolymers as foam stabilizers.

The subject-matter of the invention enables provision of rigid PU foam, dispensing with the known siloxane-containing stabilizers. The resulting PU foams nevertheless meet the known demands. They are advantageously dimensionally stable, hydrolysis-stable and have excellent long-term characteristics. They advantageously have very good insulation properties, a very high insulation capacity, high mechanical strength, high stiffness and high compressive strength. The subject-matter of the invention also enables the provision of rigid PU foam, with use jointly with the siloxane-containing stabilizers known from the prior art.

Acrylate and/or methacrylate copolymers are already known from the prior art.

If the acrylate and/or methacrylate copolymers to be used in accordance with the invention are based on at least one comonomer of the $H_2C=CR^1-COOR^2$ type and at least one comonomer of the $H_2C=CR^1-COOR^3$ type, where $R^1$ may be —H or —$CH_3$, wherein different comonomers having different $R^1$ substituents from one another may be present within one molecule, $R^2$ may be each independently a radical from the group comprising saturated or unsaturated, linear, cyclic or branched, aliphatic or aromatic hydrocarbons having 1 to 25 carbon atoms, preferably methyl, ethyl, n-butyl, isobutyl, t-butyl, 2-ethylhexyl, isodecyl, cyclohexyl, benzyl, phenyl, isobornyl or allyl, wherein different comonomers having different $R^2$ substituents from one another may be present within one molecule, $R^3$ may be each independently a radical from the group of polyethers based on structure 1, wherein different comonomers having different $R^3$ substituents from one another may be present within one molecule,

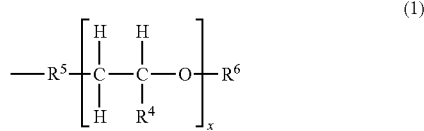

(1)

in which x=3 to 500, preferably >5, especially 8 to 100, $R^4$ may be each independently a hydrogen radical or a radical from the group comprising saturated or unsaturated, linear, cyclic or branched, aliphatic or aromatic hydrocarbons having 1 to 12 carbon atoms, particularly preferably —H, methyl, ethyl or styryl, wherein within a radical $R^3$ different $R^4$ substituents may be present in any order or sequence, $R^5$ is -$CH_2$—O—, —$CH_2$—$CH_2$—O—, —$CH_2$—$CH_2$—$CH_2$—O—, —$CH_2$—$CH_2$—$CH_2$—$CH_2$—O— or —$CH_2$—$CH_2$—$CH_2$—$CH_2$—$CH_2$—O—, wherein $R^5$ may also be omitted, $R^6$ may be each independently a hydrogen radical, a radical from the group comprising saturated or unsaturated, linear, cyclic or branched, aliphatic or aromatic hydrocarbons having 1 to 25 carbon atoms, an acyl radical, a radical of the structure-$CH_2$—CH(OH)—$CH_2$OH or a radical of the structure-$CH_2$—C($CH_2$OH)$_2$—$CH_2$—$CH_3$, particularly preferably —H, methyl, ethyl, n-propyl, isopropyl, n-butyl, isobutyl, sec-butyl or t-butyl, wherein different comonomers having different $R^6$ substituents from one another may be present within one molecule, this is a particularly preferred embodiment of the invention.

If the acrylate and/or methacrylate copolymers to be used in accordance with the invention have a number-average molecular weight Mn, determined by gel permeation chromatography in accordance with DIN 55672-1:2016-03 (eluent: THF; standard: PMMA), in the range of 500 to 100 000 g/mol, particularly preferably 1000 to 20 000 g, this is a further particularly preferred embodiment of the invention.

Usable acrylate and/or methacrylate monomers in the context of the invention are also commercially available, for example under the trade name VISIOMER from Evonik Operations GmbH.

Examples of these, but not limited thereto, are methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, ethylhexyl (meth)acrylate, isodecyl (meth)acrylate, cyclohexyl (meth)acrylate, tetrahydrofurfuryl (meth)acrylate, isobornyl (meth)acrylate, benzyl (meth)acrylate, phenyl (meth)acrylate, phenylethyl (meth)acrylate, 3,3,5-trimethylcyclohexyl (meth)acrylate, hydroxyalkyl (meth)acrylates such as 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol (meth)acrylate, 1,10-decanediol (meth)acrylate; glycol dimethacrylates such as 1,4-butanediol methacrylate, 2-butoxyethyl methacrylate, 2-ethoxyethoxymethyl methacrylate, 2-ethoxyethyl methacrylate; methacrylates of ether alcohols such as tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate and ethoxylated or propoxylated (meth)acrylates preferably having 1 to 20, especially 2 to 8 ethoxy groups or propoxy groups.

The notation "(meth)acrylate" here means both methacrylate, for example methyl methacrylate, ethyl methacrylate, etc., and acrylate, for example methyl acrylate, ethyl acrylate, etc., and mixtures of the two.

In addition, methods for preparing usable acrylate and/or methacrylate copolymers are known from the prior art and are described, for example, in EP1070730 or U.S. Pat. No. 9,349,500 B2.

In principle, it is possible to use compounds that decompose into radicals under the polymerization conditions as initiators, for example peroxides, hydroperoxides, hydrogen peroxide, persulfates, azo compounds and the so-called redox initiators. In some cases, it may also be advantageous to use mixtures of different initiators, for example mixtures of hydrogen peroxide and sodium or potassium peroxodisulfate. Organic peroxides are, for example, acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl peroxy-2-ethylhexanoate, tert-butyl perisononanoate, tert-butyl permaleate, tert-butyl perbenzoate, di-(2-ethylhexyl) peroxydicarbonate, dicyclohexyl peroxydicarbonate, di-(4-tert-butylcyclohexyl) peroxydicarbonate, dimyristil peroxydicarbonate, diacetyl peroxydicarbonate, allyl peresters, cumyl peroxyneodecanoate, tert-butyl per-3,5,5-trimethylhexanoate, acetyl cyclohexylsulfonyl peroxide, dilauryl peroxide and tert-amyl peroxy-2-ethylhexanoate. Further initiators are azo compounds, e.g. 2,2'-azobisisobutyronitrile, 2,2'-azobis(2,4-dimethylvaleronitrile) and 2,2'-azobis(4-methoxy-2,4-dimethylvaleronitrile).

Surprisingly, it has been found in the context of the present invention that acrylate and/or methacrylate copolymers according to the invention should preferably be produced using tert-butyl peroxy-2-ethylhexanoate (TBPEH) or tert-amyl peroxy-2-ethylhexanoate (APO) or a combination of TBPEH and APO as initiator, since even better results can then be achieved with respect to the results sought according to the invention. In particular, however, acrylate and/or methacrylate copolymers produced using dibenzoyl peroxide (BPO) as initiator proved to be rather detrimental and rather unsuitable for the concerns of the present invention. It therefore corresponds to a particularly preferred embodiment of the invention when the acrylate and/or methacrylate copolymers to be used according to the invention are those which have not been produced using BPO as initiator.

Furthermore, it corresponds to a particularly preferred embodiment of this invention when the acrylate and/or methacrylate copolymers have a residual monomer content of <1%. The residual monomer content can be determined by customary methods; in particular, it can be determined via the solids content or by GC or HPLC. Appropriate compositions enable particularly advantageous foams according to the invention which are also particularly low in emissions.

In addition to the acrylate and/or methacrylate copolymers to be used as foam stabilizers in accordance with the invention, particular blowing agents are used in accordance with the invention comprising hydrocarbons having 3, 4 or 5 carbon atoms, hydrofluorocarbons, hydrofluoroolefins (HFO), hydrohaloolefins, oxygen-containing blowing agents and/or chlorohydrocarbons.

In turn, a further particularly preferred embodiment of the invention is when the blowing agents used are hydrocarbons having 3, 4 or 5 carbon atoms, preferably cyclo-, iso- and/or n-pentane, hydrofluorocarbons, preferably HFC 245fa, HFC 134a and HFC 365mfc, perfluorinated compounds such as perfluoropentane, perfluorohexane and/or perfluorohexene, hydrofluoroolefins or hydrohaloolefins, preferably 1234ze, 1234yf, 1224 yd, 1233zd(E) and/or 1336mzz, oxygen-containing compounds such as methyl formate, acetone and/or dimethoxymethane, and/or chlorohydrocarbons, preferably dichloromethane and/or 1,2-dichloroethane.

If the proportion by mass of the total amount of acrylate and/or methacrylate copolymers, based on 100 parts by mass of polyol component, is 0.1 to 10 pphp, preferably 0.5 to 5 pphp and particularly preferably 1 to 4 pphp, this is again a preferred embodiment of the invention.

The present invention makes it possible to dispense with Si-containing foam stabilizers. In this context, compositions according to the invention that contain Si-containing foam stabilizers, based on the total amount of foam stabilizers, to an extent of less than 15% by weight, preferably less than 10% by weight, further preferably less than 5% by weight, more preferably less than 3% by weight, even more preferably less than 1% by weight, especially less than 0.5% by weight, if at all, are a preferred embodiment of the invention.

As mentioned, the present invention additionally also enables the parallel use of Si-containing foam stabilizers. In this context, compositions according to the invention that contain Si-containing foam stabilizers, based on the total amount of foam stabilizers, to an extent of more than 1% by weight, preferably more than 10% by weight, especially more than 20% by weight, are a preferred embodiment of the invention. In the context of such an embodiment, for example, 50% by weight:50% by weight mixtures are also possible; i.e, the composition would comprise equal portions of the acrylate and/or methacrylate copolymers to be used according to the invention and also Si-containing foam stabilizers. Indeed, it was found, surprisingly, that the acrylate and/or methacrylate copolymers to be used according to the invention improve the emulsifying capacity of Si-containing foam stabilizers.

In addition to the acrylate and/or methacrylate copolymers to be used according to the invention, in principle all foam-stabilizing components known in accordance with the prior art can also be used.

The acrylate and/or methacrylate copolymers to be used according to the invention can be used in neat form or else in a solvent. In this context, it is possible to use all suitable substances usable in the production of PU foams. Solvents used are preferably substances which are already used in standard formulations, for example OH-functional compounds, polyols, flame retardants, etc.

A preferred composition according to the invention comprises the following constituents:
a) acrylate and/or methacrylate copolymers according to the invention, as described above,
b) at least one polyol component,
c) at least one polyisocyanate and/or polyisocyanate prepolymer,
d) optionally a catalyst which accelerates or controls the reaction of polyols b) with the isocyanates c),
e) optionally further foam stabilizers, especially corresponding silicon-containing compounds,
f) blowing agents according to the invention, as described above,
g) optionally further additives, fillers, flame retardants, etc.

It is preferable here that component d) is obligatory.

In a preferred embodiment of the invention, the polyurethane foams are produced using, as well as the acrylate and/or methacrylate copolymers according to the invention and the blowing agent according to the invention, a component having at least 2 isocyanate-reactive groups, preferably a polyol component, a catalyst and a polyisocyanate and/or a polyisocyanate prepolymer. The catalyst is introduced here especially via the polyol component. Suitable polyol components, catalysts and polyisocyanates and/or polyisocyanate prepolymers are well known to the person skilled in the art, but are described in more detail hereinafter.

Polyols suitable as polyol component b) for the purposes of the present invention are all organic substances having two or more isocyanate-reactive groups, preferably OH groups, and also formulations thereof. Preferred polyols are all polyether polyols and/or polyester polyols and/or hydroxyl-containing aliphatic polycarbonates, especially polyether polycarbonate polyols, and/or polyols of natural origin, known as "natural oil-based polyols" (NOPs) which are customarily used for producing polyurethane systems, especially polyurethane coatings, polyurethane elastomers or foams. The polyols typically have a functionality of from 1.8 to 8 and number-average molecular weights in the range from 500 to 15 000. Polyols having OH values within a range from 10 to 1200 mg KOH/g are typically used.

For production of rigid PU foams, it is possible with preference to use polyols or mixtures thereof, with the proviso that at least 90 parts by weight of the polyols present, based on 100 parts by weight of polyol component, have an OH number greater than 100, preferably greater than 150, especially greater than 200. The fundamental difference between flexible foam and rigid foam is that flexible foam shows elastic characteristics and is reversibly deformable. When the flexible foam is deformed by expenditure of force, it returns to its starting shape as soon as the force ceases. By contrast, rigid foam is permanently deformed. This is well known to those skilled in the art.

Polyether polyols are obtainable by known methods, for example by anionic polymerization of alkylene oxides in the presence of alkali metal hydroxides, alkali metal alkoxides or amines as catalysts and by addition of at least one starter molecule which preferably contains 2 or 3 reactive hydrogen atoms in bonded form, or by cationic polymerization of alkylene oxides in the presence of Lewis acids, for example antimony pentachloride or boron trifluoride etherate, or by double metal cyanide catalysis. Suitable alkylene oxides contain from 2 to 4 carbon atoms in the alkylene radical. Examples are tetrahydrofuran, 1,3-propylene oxide, 1,2-butylene oxide and 2,3-butylene oxide; ethylene oxide and 1,2-propylene oxide are preferably used. The alkylene oxides may be used individually, cumulatively, in blocks, in alternation or as mixtures. Styrene oxide is also suitable. Starter molecules used may especially be compounds having at least 2, preferably 2 to 8, hydroxyl groups, or having at least two primary amino groups in the molecule. Starter molecules used may, for example, be water, di-, tri- or tetrahydric alcohols such as ethylene glycol, propane-1,2- and-1,3-diol, diethylene glycol, dipropylene glycol, glycerol, trimethylolpropane, pentaerythritol, castor oil, etc., higher polyfunctional polyols, especially sugar compounds, for example glucose, sorbitol, mannitol and sucrose, polyhydric phenols, resols, for example oligomeric condensation products of phenol and formaldehyde and Mannich condensates of phenols, formaldehyde and dialkanolamines, and also melamine, or amines such as aniline, EDA, TDA, MDA and PMDA, more preferably TDA and PMDA. The choice of the suitable starter molecule is dependent on the respective field of application of the resulting polyether polyol in the production of polyurethane.

Polyester polyols are based on esters of polybasic aliphatic or aromatic carboxylic acids, preferably having 2-12 carbon atoms. Examples of aliphatic carboxylic acids are succinic acid, glutaric acid, adipic acid, suberic acid, azelaic acid, sebacic acid, decanedicarboxylic acid, maleic acid and fumaric acid. Examples of aromatic carboxylic acids are phthalic acid, isophthalic acid, terephthalic acid and the isomeric naphthalenedicarboxylic acids. The polyester polyols are obtained by condensation of these polybasic carboxylic acids with polyhydric alcohols, preferably of diols or triols having 2 to 12, more preferably having 2 to 6, carbon atoms, preferably ethylene glycol, diethylene glycol, trimethylolpropane and glycerol.

Polyether polycarbonate polyols are polyols containing carbon dioxide in the bonded form of the carbonate. Since carbon dioxide is formed as a by-product in large volumes in many processes in the chemical industry, the use of carbon dioxide as comonomer in alkylene oxide polymerizations is of particular interest from a commercial viewpoint. Partial replacement of alkylene oxides in polyols with carbon dioxide has the potential to distinctly lower the costs for the production of polyols. Moreover, the use of $CO_2$ as comonomer is very environmentally advantageous, since this reaction constitutes the conversion of a greenhouse gas into a polymer. The preparation of polyether polycarbonate polyols by addition of alkylene oxides and carbon dioxide to H-functional starter substances with the use of catalysts has been known for a long time. Various catalyst systems may be used here: The first generation was that of heterogeneous zinc or aluminium salts, as described, for example, in U.S. Pat. No. 3,900,424 or U.S. Pat. No. 3,953,383. In addition, mono- and binuclear metal complexes have been used successfully for copolymerization of $CO_2$ and alkylene oxides (WO 2010/028362, WO 2009/130470, WO 2013/022932 or WO 2011/163133). The most important class of catalyst systems for the copolymerization of carbon dioxide and alkylene oxides is that of double metal cyanide catalysts, also referred to as DMC catalysts (U.S. Pat. No. 4,500,704, WO 2008/058913). Suitable alkylene oxides and H-functional starter substances are those also used for preparing carbonate-free polyether polyols, as described above.

Polyols based on renewable raw materials, natural oil-based polyols (NOPs), for production of polyurethane foams are of increasing interest with regard to the long-term limits in the availability of fossil resources, namely oil, coal and gas, and against the background of rising crude oil prices, and have already been described many times in such applications (WO 2005/033167; US 2006/0293400, WO 2006/094227, WO 2004/096882, US 2002/0103091, WO 2006/116456 and EP 1678232). A number of such polyols are now available on the market from various manufacturers (WO 2004/020497, US 2006/0229375, WO 2009/058367). Polyols having a varying property profile are obtained, depending on the base raw material (e.g. soybean oil, palm oil or castor oil) and subsequent workup. A distinction may essentially be made between two groups: a) polyols based on renewable raw materials that are modified such that they may be used to an extent of 100% in the production of polyurethanes (WO 2004/020497, US 2006/0229375); b) polyols based on renewable raw materials that on account of their processing and properties are able to replace the petrochemical-based polyol only up to a certain proportion (WO 2009/058367).

A further class of usable polyols is that of the so-called filled polyols (polymer polyols). A feature of these is that they contain dispersed solid organic fillers up to a solids content of 40% or more. Usable polyols include SAN, PUD and PIPA polyols. SAN polyols are highly reactive polyols containing a dispersed copolymer based on styrene-acrylonitrile (SAN). PUD polyols are highly reactive polyols containing polyurea, likewise in dispersed form. PIPA polyols are highly reactive polyols containing a dispersed polyurethane, for example formed by in situ reaction of an isocyanate with an alkanolamine in a conventional polyol.

A further class of useful polyols are those which are obtained as prepolymers via reaction of polyol with isocyanate in a molar ratio of preferably 100:1 to 5:1, more preferably 50:1 to 10:1. Such prepolymers are preferably made up in the form of a solution in polyol, with the polyol preferably corresponding to the polyol used for preparing the prepolymers.

A preferred ratio of isocyanate and polyol, expressed as the index of the formulation, i.e. as stoichiometric ratio of isocyanate groups to isocyanate-reactive groups (e.g. OH groups, NH groups) multiplied by 100, in the context of this invention, is in the range from 10 to 1000, preferably 40 to 500. This corresponds to a preferred embodiment of the invention. An index of 100 represents a molar ratio of reactive groups of 1:1.

The isocyanate components c) used are preferably one or more organic polyisocyanates having two or more isocyanate functions. The polyol components used are preferably one or more polyols having two or more isocyanate-reactive groups, preferably OH groups.

Isocyanates suitable as isocyanate components for the purposes of this invention are all isocyanates containing at least two isocyanate groups. It is generally possible to use all aliphatic, cycloaliphatic, arylaliphatic and preferably aromatic polyfunctional isocyanates known per se. Isocyanates are more preferably used within a range from 60 to 200 mol %, relative to the sum total of the isocyanate-consuming components.

Specific examples are: alkylene diisocyanates having 4 to 12 carbon atoms in the alkylene moiety, for example dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate (HMDI), cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate or IPDI for short), hexahydrotolylene 2,4- and 2,6-diisocyanate and also the corresponding isomeric mixtures, and preferably aromatic diisocyanates and polyisocyanates such as tolylene 2,4- and 2,6-diisocyanate (TDI) and the corresponding isomeric mixtures, naphthalene diisocyanate, diethyltoluene diisocyanate, mixtures of diphenylmethane 2,4'- and 2,2'-diisocyanates (MDI) and polyphenyl polymethylene polyisocyanates (crude MDI) and mixtures of crude MDI and tolylene diisocyanates (TDI). The organic diisocyanates and polyisocyanates may be used individually or in the form of mixtures thereof. It is likewise possible to use corresponding "oligomers" of the diisocyanates (IPDI trimer based on isocyanurate, biurets, uretdiones). In addition, the use of prepolymers based on the abovementioned isocyanates is possible.

It is also possible to use isocyanates that have been modified by the incorporation of urethane, uretdione, isocyanurate, allophanate and other groups, which are termed modified isocyanates.

Particularly suitable organic polyisocyanates that are therefore used with particular preference are various isomers of tolylene diisocyanate (tolylene 2,4- and 2,6-diisocyanate (TDI), in pure form or as isomer mixtures of varying composition), diphenylmethane 4,4'-diisocyanate (MDI), "crude MDI" or "polymeric MDI" (containing the 4,4' isomer and also the 2,4' and 2,2' isomers of MDI and products having more than two rings) and also the two-ring product that is referred to as "pure MDI" and is composed predominantly of 2,4' and 4,4' isomer mixtures, and prepolymers derived therefrom. Examples of particularly suitable isocyanates are detailed, for example, in EP 1712578, EP 1161474, WO 00/58383, US 2007/0072951, EP 1678232 and WO 2005/085310, which are hereby fully incorporated by reference.

Suitable, optionally usable catalysts d) in the context of the present invention are all compounds capable of accelerating the reaction of isocyanates with OH functions, NH functions or other isocyanate-reactive groups. It is possible here to make use of the customary catalysts known from the prior art, including, for example, amines (cyclic, acyclic; monoamines, diamines, oligomers having one or more amino groups), organometallic compounds and metal salts, preferably those of iron, bismuth and zinc. In particular, it is possible to use mixtures of a plurality of components as catalysts.

It has been found that compositions according to the invention which do not comprise tin-containing catalysts have proved to be particularly advantageous for achieving the results sought according to the invention. A composition according to the invention which is essentially free of tin-containing catalysts therefore corresponds to a particularly preferred embodiment of the invention. This also applies to the processes for producing rigid polyurethane foam described below. It is also a preferred embodiment of the invention when essentially no tin-containing catalysts are used.

Component e) is optionally usable further foam stabilizers that are not acrylate and/or methacrylate copolymers according to the invention. They may preferably be surface-active silicon compounds which serve to further optimize the desired cell structure and the foaming process. In the context of this invention, it is possible to use any Si-containing compounds which promote foam production (stabilization, cell regulation, cell opening, etc.). These compounds are sufficiently well known from the prior art. Surface-active Si-containing compounds may be any known compounds suitable for production of PU foam.

Siloxane structures of this type which are usable in the context of this invention are described, for example, in the following patent documents, although these describe use only in conventional polyurethane foams, as moulded foam, mattress, insulation material, construction foam, etc: CN 103665385, CN 103657518, CN 103055759, CN 103044687, US 2008/0125503, US 2015/0057384, EP 1520870 A1, EP 1211279, EP 0867464, EP 0867465, EP 0275563. These documents are hereby incorporated by reference and are considered to form part of the disclosure-content of the present invention.

The use of blowing agent f) is obligatory, as already explained above. It is mandatory to use at least one blowing agent according to the invention. When necessary, further blowing agents may additionally also be used. It is possible to work with chemical and physical blowing agents.

According to the total amount of blowing agent used, a foam having high or low density is produced. For instance, foams having densities of 5 kg/m³ to 900 kg/m³ can be produced. Preferred densities are 8 to 800, more preferably 10 to 600 kg/m³, especially 30 to 150 kg/m³.

Physical blowing agents used may in principle be appropriate compounds having suitable boiling points. It is likewise possible in principle to use chemical blowing agents which react with NCO groups and release gases, for example water or formic acid. Examples of customary blowing agents are liquefied $CO_2$, nitrogen, air, highly volatile liquids.

Optional additives g) that may be used include all substances which are known from the prior art and find use in the production of polyurethanes, preferably PU foam, especially rigid polyurethane foams, for example crosslinkers and chain extenders, stabilizers against oxidative degradation (known as antioxidants), flame retardants, surfactants, biocides, cell-refining additives, cell openers, solid fillers, antistatic additives, nucleating agents, thickeners, dyes, pigments, color pastes, fragrances, emulsifiers etc.

Flame retardants included in the composition according to the invention may be any of the known flame retardants which are suitable for production of polyurethane foams. Suitable flame retardants for the purposes of this invention are preferably liquid organophosphorus compounds such as halogen-free organophosphates, e.g. triethyl phosphate (TEP), halogenated phosphates, e.g. tris(1-chloro-2-propyl) phosphate (TCPP) and tris(2-chloroethyl) phosphate (TCEP), and organic phosphonates, e.g. dimethyl methanephosphonate (DMMP), dimethyl propanephosphonate (DMPP), or solids such as ammonium polyphosphate (APP) and red phosphorus. Furthermore, halogenated compounds, for example halogenated polyols, and solids such as expandable graphite, aluminium oxides, antimony compounds and melamine are suitable as flame retardants. The inventive use of the acrylate and/or methacrylate copolymers enables the use of very high amounts of flame retardant, especially also liquid flame retardants, for example TEP, TCPP, TCEP, DMMP, which normally leads to comparatively unstable formulations.

The invention further provides a process for producing rigid polyurethane foam by reacting one or more polyol components with one or more isocyanate components, wherein the reaction takes place in the presence of blowing agents comprising hydrocarbons having 3, 4 or 5 carbon atoms, hydrofluorocarbons, hydrofluoroolefins (HFO), hydrohaloolefins, oxygen-containing blowing agents and/or chlorohydrocarbons, and of acrylate and/or methacrylate copolymers as foam stabilizers, especially using a composition according to the invention as described above. In order to avoid repetition, reference is made in this regard to the preceding text. Especially with regard to preferred embodiments of the invention, reference is made to the preceding text. The acrylate and/or methacrylate copolymers according to the invention act as foam stabilizer.

The rigid PU foams to be produced in accordance with the invention have densities of preferably 5 kg/m$^3$ to 900 kg/m$^3$, more preferably 8 to 800, especially preferably 10 to 600 kg/m$^3$, more particularly 20 to 150 kg/m$^3$.

More particularly, it is possible to obtain closed-cell rigid PU foams wherein the closed-cell content is advantageously >80%, preferably >90%. This is a very particularly preferred embodiment of the invention. The closed-cell content, in the context of this invention, is preferably determined in accordance with DIN ISO 4590: 2016-4590 by pycnometer.

The process according to the invention for producing rigid PU foams can be conducted by the known methods, for example by manual mixing or preferably by means of foaming machines. If the process is carried out by using foaming machines, it is possible to use high-pressure or low-pressure machines. The process according to the invention can be carried out either batchwise or continuously.

A preferred rigid polyurethane or polyisocyanurate foam formulation according to the present invention gives a foam density of from 5 to 900 kg/m$^3$ and has the composition shown in Table 1.

TABLE 1

Composition of a preferred rigid polyurethane or polyisocyanurate foam formulation

| Component | Proportion by weight |
| --- | --- |
| Inventive acrylate and/or methacrylate copolymers | >0.5 to 5 |
| Polyol | >0 to 99.9 |
| Amine catalyst | 0 to 5 |
| Metal catalyst | 0 to 10 |
| Polyether siloxane | 0 to 5 |
| Water | 0.01 to 20 |
| Inventive blowing agent | >0 to 40 |
| Further additives (flame retardants, etc.) | 0 to 300 |
| Isocyanate index: 10 to 1000 | |

For further preferred embodiments and configurations of the process according to the invention, reference is also made to the details already given above in connection with the composition according to the invention, especially to the preferred embodiments specified there.

The invention further provides a rigid PU foam obtainable by the process mentioned.

According to a further preferred embodiment of the invention, the rigid PU foam has a foam density of 5 to 900 kg/m$^3$, preferably 8 to 750 kg/m$^3$, particularly preferably 10 to 350 kg/m$^3$, especially 20 to 150 kg/m$^3$, and the closed-cell content is advantageously >80%, preferably >90%.

It is advantageously a feature of the rigid polyurethane foams according to the invention that they include at least one acrylate and/or methacrylate copolymer according to the invention, as described above, and are obtainable using a blowing agent according to the invention, preferably by the process according to the invention.

The PU foams according to the invention (polyurethane or polyisocyanurate foams) are rigid PU foams and can be used as or for production of insulation materials, preferably insulation panels, refrigerators, insulating foams, vehicle seats, especially automobile seats, roof liners, mattresses, filter foams, packaging foams or spray foams.

The PU foams according to the invention, especially rigid PU foams, can be used advantageously particularly in the refrigerated warehouse, refrigeration appliances and domestic appliances industry, for example for production of insulating panels for roofs and walls, as insulating material in containers and warehouses for frozen goods, and for refrigeration and freezing appliances.

Further preferred fields of use are in vehicle construction, especially for production of vehicle inner roof liners, bodywork parts, interior trim, cooled vehicles, large containers, transport pallets, packaging laminates, in the furniture industry, for example for furniture parts, doors, linings, in electronics applications.

Cooling apparatuses according to the invention have, as insulation material, a rigid PU foam according to the invention (polyurethane or polyisocyanurate foam).

The invention further provides for the use of the rigid PU foam as insulation material in refrigeration technology, in refrigeration equipment, in the construction sector, automobile sector, shipbuilding sector and/or electronics sector, as insulating panels, as spray foam, as one-component foam.

The invention further relates to the use of a composition according to the invention comprising acrylate and/or methacrylate copolymer as foam stabilizer, as described above, and comprising blowing agent according to the invention, as described above, for providing rigid polyurethane foam having improved insulation properties.

The subject matter of the invention is described by way of example above or hereinafter, without any intention that the invention be restricted to these illustrative embodiments. Where ranges, general formulae or compound classes are specified above or hereinafter, these are intended to include not only the corresponding ranges or groups of compounds which are explicitly mentioned but also all subranges and subgroups of compounds which can be obtained by removing individual values (ranges) or compounds. Where documents are cited in the context of the present description, the entire content thereof, particularly with regard to the subject matter that forms the context in which the document has been cited, is intended to form part of the disclosure content of the present invention. Unless otherwise stated, percentages are in percent by weight. Where averages are reported above or hereinafter, these are weight averages unless stated otherwise. Where parameters that have been determined by measurement are given above or hereinafter, the measurements have been conducted at a temperature of 25° C. and a pressure of 101 325 Pa, unless stated otherwise.

The examples that follow describe the present invention by way of example, without any intention that the invention, the scope of application of which is apparent from the entirety of the description and the claims, be restricted to the embodiments specified in the examples.

EXAMPLES

Example 1: Synthesis of Copolymers a to F

Copolymer A:

In a 500 mL four-necked flask equipped with reflux condenser and N2 line, sabre stirrer (200 rpm) and Pt100 digital internal thermometer, 30.01 g of n-butyl acetate were initially charged and the oil bath was heated to 145° C. A mixture of 9.2 g of TBPEH (tert-butyl peroxy-2-ethylhexanoate), 56.18 g of isobutyl methacrylate (i-BMA), 67.29 g of MPEG500 methacrylate (MPEG500MA) and 2.21 g of 2-mercaptoethanol was metered in over a 4 h period using a peristaltic pump. The mixture was stirred for a further 30 min at this temperature. The mixture was cooled to 80° C., 0.13 g of TBPEH dissolved in 10 g of n-butyl acetate were metered in for postreaction and the mixture was further stirred at 80° C. for 2 h. A further 5 g of n-butyl acetate were added and the mixture was further stirred for 30 min without heating.

GPC according to DIN 55672-1:2016-03 (eluent: THF; standard: PMMA): Mw=5630 g/mol; Mn=2560 g/mol; PDI=2.2.

Copolymer B:

In a 500 mL four-necked flask equipped with reflux condenser and N2 line, sabre stirrer (200 rpm) and Pt100 digital internal thermometer, 30.01 g of n-butyl acetate were initially charged and the oil bath was heated to 145° C. A mixture of 9.2 g of TBPEH, 54.69 g of isodecyl methacrylate (IDMA), 68.77 g of MPEG500MA and 2.21 g of 2-mercaptoethanol was metered in over a 4 h period using a peristaltic pump. The mixture was stirred for a further 30 min at this temperature. The mixture was cooled to 80° C., 0.13 g of TBPEH dissolved in 10 g of n-butyl acetate were metered in for postreaction and the mixture was further stirred at 80° C. for 2 h. A further 5 g of n-butyl acetate were added and the mixture was further stirred for 30 min without heating.

GPC according to DIN 55672-1:2016-03 (eluent: THF; standard: PMMA): Mw=5250 g/mol; Mn=2410 g/mol; PDI=2.2.

Copolymer C:

In a 500 mL four-necked flask equipped with reflux condenser and N2 line, sabre stirrer (200 rpm) and Pt100 digital internal thermometer, 30.01 g of n-butyl acetate were initially charged and the oil bath was heated to 145° C. A mixture of 20.75 g of BP-50-FT (BPO), 50.92 g of iBMA), 60.99 g of MPEG500MA and 2.21 g of 2-mercaptoethanol was metered in over a 4 h period using a peristaltic pump. The mixture was stirred for a further 30 min at this temperature. The mixture was cooled to 80° C., 0.13 g of BP-50-FT dissolved in 10 g of n-butyl acetate were metered in for postreaction and the mixture was further stirred at 80° C. for 2 h. A further 5 g of n-butyl acetate were added and the mixture was further stirred for 30 min without heating.

GPC according to DIN 55672-1:2016-03 (eluent: THF; standard: PMMA): Mw=6350 g/mol; Mn=4080 g/mol; PDI=1.6.

Copolymer D:

In a 1000 mL four-necked flask equipped with reflux condenser and N2 line, sabre stirrer (100 rpm) and Pt100 digital internal thermometer, a mixture of 265.05 g of petroleum benzine (bp 100-120° C.) and 265.05 g of toluene were initially charged and the oil bath was heated to 135° C. A mixture of 4.43 g of BP-50-FT, 90.59 g of C17,4MA (stearyl methacrylate), 55.02 g of MPEG350MA (MPEG350 methacrylate) and 19.06 g of i-BMA was metered in over a 5 h period using a peristaltic pump. On completion of the metered addition, 0.40 g of BP-50-FT was added for the postreaction and the mixture was further stirred for 2 h. The mixture was cooled to room temperature and left overnight in the flask without stirring. The oil bath was heated again to 130° C., 0.40 g of BP-50-FT was added once more and the mixture stirred for 3 h. The mixture was concentrated on a rotary evaporator and the solvent mixture completely removed. 150 g of the solvent-free polymer were dissolved in 150 g of n-butyl acetate.

GPC according to DIN 55672-1:2016-03 (eluent: THF; standard: PMMA): Mw=14 900 g/mol; Mn=8610 g/mol; PDI=1.7.

Copolymer E:

In a 500 mL four-necked flask equipped with reflux condenser and N2 line, dropping funnel, KPG stirrer (200 rpm) and Pt100 digital internal thermometer, 29.9 g of n-butyl acetate were initially charged and the oil bath was heated to 145° C. A mixture of 9.8 g of APO, 56.0 g of i-BMA, 67.1 g of MPEG500MA and 2.2 g of 2-mercaptoethanol was added dropwise over a 4 h period. In this case, the mixture was initially added dropwise for 1.5 h at a drop rate of 1 drop per 4 seconds and then for a further 2.5 h at a drop rate of 1 drop per 2 seconds and the mixture further stirred at this temperature for 30 minutes. The mixture was cooled to 80° C. and 0.14 g of APO dissolved in 10 g of n-butyl acetate was metered in for postreaction. A further 15 g of isobutyl acetate were added and the mixture was further stirred for 30 min without heating.

GPC according to DIN 55672-1:2016-03 (eluent: THF; standard: PMMA): Mw=8474 g/mol; Mn=2426 g/mol; PDI=3.5.

Copolymer F:

In a 550 mL four-necked flask equipped with reflux condenser and N2 line, dropping funnel, KPG stirrer (200 rpm) and Pt100 digital internal thermometer, 29.9 g of n-butyl acetate were initially charged and the oil bath was heated to 145° C. A mixture of 9.8 g of APO, 56.0 g of i-BMA, 67.1 g of MPEG500MA and 2.2 g of 2-mercaptoethanol was added dropwise continuously over a 4 h period at a drop rate of 1 drop per 2 seconds and the mixture was further stirred at this temperature for 30 minutes. The mixture was cooled to 80° C. and 0.14 g of APO dissolved in 10 g of n-butyl acetate was metered in for postreaction. A further 15 g of isobutyl acetate were added and the mixture was further stirred for 30 min without heating.

GPC according to DIN 55672-1:2016-03 (eluent: THF; standard: PMMA): Mw=6181 g/mol; Mn=2276 g/mol; PDI=2.7.

Example 2: Rigid PUR Foam

The following foam formulation was used for the performance comparison:

| Component | Proportion by weight |
|---|---|
| Polyether polyol* | 100 |
| Catalyst** | 2 |
| Surfactant*** | 2 |
| Water | 1 |

| Component | Proportion by weight |
| --- | --- |
| Cyclopentane | 14 |
| MDI**** | 193 |

*Daltolac ® R 471 from Huntsman, OH number 470 mg KOH/g
**POLYCAT ® 8 from Evonik Operations GmbH
*Surfactants: **Copolymers as described in Example 1 or TEGOSTAB ® B 8491 from Evonik Operations GmbH
****Polymeric MDI, 200 mPa*s, 31.5% NCO, functionality 2.7.

The comparative foamings were carried out by hand mixing. For this purpose, polyol, catalysts, water, foam stabilizer and blowing agent were weighed into a beaker and mixed by means of a disc stirrer (diameter 6 cm) at 1000 rpm for 30 s. By reweighing, the amount of blowing agent that had evaporated in the mixing operation was determined and added again. The MDI was now added, the reaction mixture was stirred with the stirrer described at 2500 rpm for 7 s and immediately transferred into an open mould having a size of 27.5×14×14 cm (W×H×D).

After 10 min, the foams were demoulded. One day after foaming, the foams were analysed. The pore structure was assessed subjectively on a scale from 1 to 10, where 10 represents an (idealized) impeccable, very fine foam and 1 represents a very significantly defective, coarse foam.

The results are compiled in the table which follows:

| Surfactant | Rating |
| --- | --- |
| TEGOSTAB B 8491 | 7.0 |
| Copolymer A | 6.5 |
| Copolymer B | 7.5 |
| Copolymer C | 1.5 |
| Copolymer D | Foam collapse |
| Copolymer E | 7.0 |
| Copolymer F | 7.0 |

The results show that it is possible with copolymers A, B and also E and F in particular to achieve pore structures and foam qualities that are at the same level as or slightly better than siloxane-based cell stabilizers.

All other application-relevant foam properties are only insignificantly affected, if at all, by the copolymers according to the invention.

Example 3: Rigid PIR Foam

The following foam formulation was used for the performance comparison:

| Component | Proportion by weight |
| --- | --- |
| Polyester polyol* | 100 |
| Amine catalyst** | 0.6 |
| Potassium trimerization catalyst*** | 4 |
| Surfactant**** | 2 |
| Water | 1 |
| Cyclopentane | 16 |
| MDI***** | 199 |

*Stepanpol ® PS 2352 from Stepan, OH number 250 mg KOH/g
**POLYCAT ® 5 from Evonik Operations GmbH
***KOSMOS ® 75 from Evonik Operations GmbH
**Surfactant: **Copolymers as described in Example 1 or TEGOSTAB ® B 8871 from Evonik Operations GmbH
****Polymeric MDI, 200 mPa*s, 31.5% NCO, functionality 2.7.

The comparative foamings were carried out by hand mixing. For this purpose, polyol, catalysts, water, foam stabilizer and blowing agent were weighed into a beaker and mixed by means of a disc stirrer (diameter 6 cm) at 1000 rpm for 30 s. By reweighing, the amount of blowing agent that had evaporated in the mixing operation was determined and added again. The MDI was now added, the reaction mixture was stirred with the stirrer described at 3000 rpm for 5 s and immediately transferred into an open mould having a size of 27.5×14×14 cm (W×H×D).

After 10 min, the foams were demoulded. One day after foaming, the foams were analysed. The pore structure was assessed subjectively on a scale from 1 to 10, where 10 represents an (idealized) impeccable, very fine foam and 1 represents a very significantly defective, coarse foam.

The results are compiled in the table which follows:

| Surfactant | Rating |
| --- | --- |
| TEGOSTAB B 8871 | 8.0 |
| Copolymer A | 7.5 |
| Copolymer B | 8.0 |
| Copolymer C | 4.5 |
| Copolymer D | 2.0 |
| Copolymer E | 8.0 |
| Copolymer F | 7.5 |

The results show that it is possible with copolymers A, B and also E and F in particular to achieve pore structures and foam qualities that are at the same level as or slightly better than siloxane-based cell stabilizers.

All other application-relevant foam properties are only insignificantly affected, if at all, by the copolymers according to the invention.

Example 4: Rigid PIR Foam

The following foam formulation was used for the performance comparison:

| Component | Proportion by weight |
| --- | --- |
| Polyester polyol* | 100 |
| Amine catalyst** | 0.4 |
| Potassium trimerization catalyst*** | 5 |
| Surfactant**** | 2 |
| Water | 0.8 |
| Cyclopentane/isopentane 70:30 | 19.5 |
| TCPP | 10 |
| MDI***** | 220 |

*Stepanpol ® PS 2412 from Stepan, OH number 240 mg KOH/g
**POLYCAT ® 5 from Evonik Operations GmbH
***KOSMOS ® 70 LO from Evonik Operations GmbH
**Surfactant: **Copolymers as described in Example 1 or TEGOSTAB ® B 8871 from Evonik Operations GmbH
****Polymeric MDI, 200 mPa*s, 31.5% NCO, functionality 2.7.

The comparative foamings were carried out by hand mixing. For this purpose, polyol, catalysts, water, foam stabilizer, flame retardant and blowing agent were weighed into a beaker and mixed by means of a disc stirrer (diameter 6 cm) at 1000 rpm for 30 s. By reweighing, the amount of blowing agent that had evaporated in the mixing operation was determined and added again. The MDI was now added, and the reaction mixture was stirred with the stirrer described at 3000 rpm for 5 s and immediately transferred into a 25 cm×50 cm×7 cm aluminium mould lined with polyethylene film and thermostated to 60° C.

After 10 min, the foams were demoulded. One day after foaming, the foams were analysed. Surface and internal defects were assessed subjectively on a scale from 1 to 10, where 10 represents an (idealized) impeccable foam and 1 represents a very significantly defective foam. The thermal conductivity coefficient (λ value in mW/m·K) was measured on 2.5 cm-thick discs with a device of the Hesto Lambda Control type, model HLC X206, at an average temperature of 10° C. in accordance with the specifications of standard EN12667:2001.

The results are compiled in the following table:

| Surfactant | Density in kg/m³ | Thermal conductivity in mW/mK | Front side surface | Reverse side surface | Internal defects | Pore structure |
|---|---|---|---|---|---|---|
| TEGOSTA BB 8871 | 37.5 | 22.3 | 6.5 | 7.0 | 7.0 | 7.0 |
| Copolymer A | 36.7 | 22.6 | 6.5 | 6.5 | 6.0 | 5.5 |
| Copolymer B | 37.4 | 22.2 | 7.0 | 7.5 | 7.0 | 6.5 |
| Copolymer D | 33.4 | 38.7 | 3.0 | 4.0 | 3.5 | 3.0 |
| Copolymer F | 38.1 | 23.5 | 6.0 | 6.0 | 7.0 | 7.0 |

The results show that it is possible with copolymers A and B in particular to achieve foam qualities and thermal conductivities that are at the same level as or slightly better than siloxane-based cell stabilizers.

All other application-relevant foam properties are only insignificantly affected, if at all, by the copolymers according to the invention.

Example 5: Rigid PIR Foam

The following foam formulation was used for the performance comparison:

| Component | Proportion by weight |
|---|---|
| Polyester polyol* | 100 |
| Amine catalyst** | 0.4 |
| Potassium trimerization catalyst*** | 5 |
| Surfactant**** | 2 |
| Water | 0.8 |
| Cyclopentane/isopentane 70:30 | 19.5 |
| TCPP | 10 |
| MDI***** | 199 |

*Isoexter 4973 from COIM, OH number 210 mg KOH/g
**POLYCAT ® 5 from Evonik Operations GmbH
***KOSMOS ® 70 LO from Evonik Operations GmbH
**Surfactant: **Copolymers as described in Example 1 or TEGOSTAB ®B 8871 from Evonik Operations GmbH
****Polymeric MDI, 200 mPa*s, 31.5% NCO, functionality 2.7.

The comparative foamings were carried out by hand mixing. For this purpose, polyol, catalysts, water, foam stabilizer, flame retardant and blowing agent were weighed into a beaker and mixed by means of a disc stirrer (diameter 6 cm) at 1000 rpm for 30 s. By reweighing, the amount of blowing agent that had evaporated in the mixing operation was determined and added again. The MDI was now added, and the reaction mixture was stirred with the stirrer described at 3000 rpm for 5 s and immediately transferred into a 25 cm×50 cm×7 cm aluminium mould lined with polyethylene film and thermostated to 60° C.

After 10 min, the foams were demoulded. One day after foaming, the foams were analysed. Surface and internal defects were assessed subjectively on a scale from 1 to 10, where 10 represents an (idealized) impeccable foam and 1 represents a very significantly defective foam. The thermal conductivity coefficient (λ value in mW/m·K) was measured on 2.5 cm-thick discs with a device of the Hesto Lambda Control type, model HLC X206, at an average temperature of 10° C. in accordance with the specifications of standard EN12667:2001.

The results are compiled in the table which follows:

| Surfactant | Density in kg/m³ | Thermal conductivity in mW/mK | Front side surface | Reverse side surface | Internal defects | Pore structure |
|---|---|---|---|---|---|---|
| TEGOSTA BB 8871 | 34.0 | 21.4 | 6.0 | 7.5 | 8.0 | 8.0 |
| Copolymer A | 34.1 | 22.3 | 6.0 | 6.5 | 7.0 | 7.5 |
| Copolymer B | 33.9 | 22.2 | 6.0 | 7.0 | 8.0 | 7.0 |
| Copolymer D | 31.3 | 42.1 | 3.0 | 3.5 | 2.5 | 2.0 |
| Copolymer F | 33.8 | 22.8 | 7.0 | 8.0 | 8.0 | 6.5 |

The results show that it is possible with copolymers A and B in particular to achieve foam qualities and thermal conductivities that are at the same level as siloxane-based cell stabilizers. All other application-relevant foam properties are only insignificantly affected, if at all, by the copolymers according to the invention.

The invention claimed is:

1. A composition for producing a rigid polyurethane foam, the composition comprising at least one isocyanate component, a polyol component, optionally a catalyst which catalyzes the formation of a urethane or isocyanurate bond, wherein the composition has hydrocarbons having 3, 4 or 5 carbon atoms, hydrofluorocarbons, hydrofluoroolefins (HFO), hydrohaloolefins, oxygen-containing blowing agents and/or chlorohydrocarbons as blowing agent, and also comprises acrylate and/or methacrylate copolymers as foam stabilizers, wherein wherein the acrylate and/or methacrylate copolymers are based on at least one comonomer of the $H_2C=CR^1—COOR^2$ type and at least one comonomer of the $H_2C=CR^1—COOR^3$ type, wherein $R^1$ may be each independently —H or —$CH_3$, wherein different comonomers having different $R^1$ substituents from one another may be present within one molecule, $R^2$ may be each independently a radical from the group comprising saturated or unsaturated, linear, cyclic or branched, aliphatic or aromatic hydrocarbons having 1 to 25 carbon atoms, wherein different comonomers having different $R^2$ substituents from one another may be present within one molecule, $R^3$ may be each independently a radical from the group of poly ethers based on structure 1, wherein different comonomers having different $R^3$ substituents from one another may be present within one molecule,

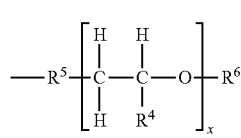

(1)

in which x=3 to 500, $R^4$ may be each independently a hydrogen radical or a radical from the group comprising saturated or unsaturated, linear, cyclic or branched, aliphatic or aromatic hydrocarbons having 1 to 12 carbon atoms, wherein within a radical $R^3$ different $R^4$ substituents may be present in any order or sequence, $R^5$ is-$CH_2$—O—, —$CH_2$—$CH_2$—O—, —$CH_2$—$CH_2$—$CH_2$—O—, —$CH_2$—$CH_2$—$CH_2$—$CH_2$—O— or —$CH_2$—$CH_2$—$CH_2$—$CH_2$—$CH_2$—O—, wherein $R^5$ may also be omitted, $R^6$ may be each independently a hydrogen radical, a radical from the group comprising saturated or unsaturated, linear, cyclic or branched, aliphatic or aromatic hydrocarbons having 1 to 25 carbon atoms, an acyl radical, a radical of the structure-$CH_2$—CH(OH)—$CH_2$OH or a radical of the structure-$CH_2$—C($CH_2$OH)$_2$—$CH_2$—$CH_3$, wherein different comonomers having different $R^6$ substituents from one another may be present within one molecule, wherein the acrylate and/or methacrylate copolymers have a number-average molecular weight Mn, determined by gel permeation chromatography in accordance with DIN 55672-1:2016-03 (eluent: THF; standard: PMMA), in the range of 500 to 20,000 g/mol, wherein the acrylate and/or methacrylate copolymers are those which have been produced without using dibenzoyl peroxide (BPO) as initiator, and wherein the isocyanates suitable as isocyanate components contain at least two isocyanate groups.

2. A composition for producing a rigid polyurethane foam, the composition comprising at least one isocyanate component, a polyol component, optionally a catalyst which catalyzes the formation of a urethane or isocyanurate bond, blowing agent, and also comprises acrylate and/or methacrylate copolymers as foam stabilizers, wherein wherein the acrylate and/or methacrylate copolymers are based on at least one comonomer of the $H_2C=CR^1$—$COOR^2$ type and at least one comonomer of the $H_2C=CR^1$—$COOR^3$ type, wherein $R^1$ may be each independently —H or —$CH_3$, wherein different comonomers having different $R^1$ substituents from one another may be present within one molecule, $R^2$ may be each independently a radical from the group comprising saturated or unsaturated, linear, cyclic or branched, aliphatic or aromatic hydrocarbons having 1 to 25 carbon atoms, wherein different comonomers having different $R^2$ substituents from one another may be present within one molecule, $R^3$ may be each independently a radical from the group of poly ethers based on structure 1, wherein different comonomers having different $R^3$ substituents from one another may be present within one molecule,

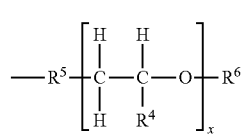

(1)

in which x=3 to 500, $R^4$ may be each independently a hydrogen radical or a radical from the group comprising saturated or unsaturated, linear, cyclic or branched, aliphatic or aromatic hydrocarbons having 1 to 12 carbon atoms, wherein within a radical $R^3$ different $R^4$ substituents may be present in any order or sequence, $R^5$ is-$CH_2$—O—, —$CH_2$—$CH_2$—O—, —$CH_2$—$CH_2$—$CH_2$—O—, —$CH_2$—$CH_2$—$CH_2$—$CH_2$—O— or —$CH_2$—$CH_2$—$CH_2$—$CH_2$—$CH_2$—O—, wherein $R^5$ may also be omitted, $R^6$ may be each independently a hydrogen radical, a radical from the group comprising saturated or unsaturated, linear, cyclic or branched, aliphatic or aromatic hydrocarbons having 1 to 25 carbon atoms, an acyl radical, a radical of the structure-$CH_2$—CH(OH)—$CH_2$OH or a radical of the structure-$CH_2$—C($CH_2$OH)$_2$—$CH_2$—$CH_3$, wherein different comonomers having different $R^6$ substituents from one another may be present within one molecule, wherein the acrylate and/or methacrylate copolymers have a number-average molecular weight Mn, determined by gel permeation chromatography in accordance with DIN 55672-1:2016-03 (eluent: THF; standard: PMMA), in the range of 500 to 20,000 g/mol, wherein the acrylate and/or methacrylate copolymers are those which have been produced without using dibenzoyl peroxide (BPO) as initiator, and wherein the isocyanates suitable as isocyanate components contain at least two isocyanate groups, wherein the blowing agents used are hydrocarbons having 3, 4 or 5 carbon atoms, hydrofluorocarbons, perfluorinated compounds, hydrofluoroolefins, hydrohaloolefins, water, oxygen-containing compounds, and/or chlorohydrocarbons.

3. The composition according to claim 1, wherein the acrylate and/or methacrylate copolymers have a number-average molecular weight Mn, determined by gel permeation chromatography in accordance with DIN 55672-1:2016-03 (eluent: THF; standard: PMMA), in the range of 1,000 to 20,000 g/mol.

4. The composition according to claim 1, wherein the proportion by mass of the total amount of acrylate and/or methacrylate copolymers, based on 100 parts by mass of polyol component, is 0.1 to 10 pphp.

5. The composition according to claim 1, wherein Si-containing foam stabilizers, based on the total amount of foam stabilizers, are present to an extent of less than 15% by weight.

6. The composition according to claim 1, wherein Si-containing foam stabilizers, based on the total amount of foam stabilizers, are present to an extent of more than 10% by weight.

7. The composition according to claim 1, wherein said composition is free of tin-containing catalysts.

8. The composition according claim 1, wherein the acrylate and/or methacrylate copolymers have been produced using TBPEH (tert-butyl peroxy-2-ethylhexanoate) and/or APO (tert-amyl peroxy-2-ethylhexanoate) as initiator.

9. The composition according claim 1, wherein the acrylate and/or methacrylate copolymers have a residual monomer content of <1%.

10. A process for producing rigid polyurethane foam, by reacting a composition according to claim 1.

11. The composition according to claim 1, wherein the acrylate and/or methacrylate copolymers are based on at least one comonomer of the $H_2C=CR^1—COOR^2$ type and at least one comonomer of the $H_2C=CR^1—COOR^3$ type, wherein $R^1$ may be each independently —H or —$CH_3$, wherein different comonomers having different $R^1$ substituents from one another may be present within one molecule, $R^2$ may be each independently a radical from the group comprising saturated or unsaturated, linear, cyclic or branched, aliphatic or aromatic hydrocarbons selected from the group consisting of methyl, ethyl, n-butyl, isobutyl, t-butyl, 2-ethylhexyl, isodecyl, cyclohexyl, benzyl, phenyl, isobornyl and allyl, $R^3$ may be each independently a radical from the group of poly ethers based on structure 1, wherein different comonomers having different $R^3$ substituents from one another may be present within one molecule,

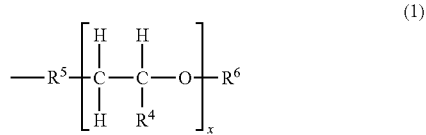

in which
x=8 to 100,
$R^4$ may be each independently a hydrogen radical or a radical from the group comprising saturated or unsaturated, linear, cyclic or branched, aliphatic or aromatic hydrocarbons selected from the group consisting of H, methyl, ethyl and styryl, wherein within a radical $R^3$ different $R^4$ substituents may be present in any order or sequence, $R^5$ is-$CH_2$—O—, —$CH_2$—$CH_2$—O—, —$CH_2$—$CH_2$—$CH_2$—O—, —$CH_2$—$CH_2$—$CH_2$—$CH_2$—O— or —$CH_2$—$CH_2$—$CH_2$—$CH_2$—$CH_2$—O—, wherein $R^5$ may also be omitted, $R^6$ is selected from the group consisting of —H, methyl, ethyl, n-propyl, isopropyl, n-butyl, isobutyl, sec-butyl and t-butyl.

12. A composition for producing a rigid polyurethane foam, the composition comprising at least one isocyanate component, a polyol component, optionally a catalyst which catalyzes the formation of a urethane or isocyanurate bond, blowing agents, and also comprises acrylate and/or methacrylate copolymers as foam stabilizers, wherein wherein the acrylate and/or methacrylate copolymers are based on at least one comonomer of the $H_2C=CR^1—COOR^2$ type and at least one comonomer of the $H_2C=CR^1—COOR^3$ type, wherein $R^1$ may be each independently —H or —$CH_3$, wherein different comonomers having different $R^1$ substituents from one another may be present within one molecule, $R^2$ may be each independently a radical from the group comprising saturated or unsaturated, linear, cyclic or branched, aliphatic or aromatic hydrocarbons having 1 to 25 carbon atoms, wherein different comonomers having different $R^2$ substituents from one another may be present within one molecule, $R^3$ may be each independently a radical from the group of poly ethers based on structure 1, wherein different comonomers having different $R^3$ substituents from one another may be present within one molecule,

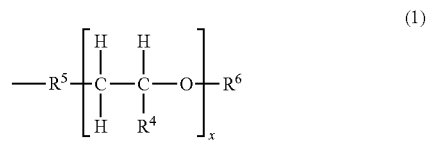

in which
x=3 to 500,
$R^4$ may be each independently a hydrogen radical or a radical from the group comprising saturated or unsaturated, linear, cyclic or branched, aliphatic or aromatic hydrocarbons having 1 to 12 carbon atoms, wherein within a radical $R^3$ different $R^4$ substituents may be present in any order or sequence, $R^5$ is-$CH_2$—O—, —$CH_2$—$CH_2$—O—, —$CH_2$—$CH_2$—$CH_2$—O—, —$CH_2$—$CH_2$—$CH_2$—$CH_2$—O— or —$CH_2$—$CH_2$—$CH_2$—$CH_2$—$CH_2$—O—, wherein $R^5$ may also be omitted, $R^6$ may be each independently a hydrogen radical, a radical from the group comprising saturated or unsaturated, linear, cyclic or branched, aliphatic or aromatic hydrocarbons having 1 to 25 carbon atoms, an acyl radical, a radical of the structure-$CH_2$—CH(OH)—$CH_2OH$ or a radical of the structure-$CH_2$—$C(CH_2OH)_2$—$CH_2$—$CH_3$, wherein different comonomers having different $R^6$ substituents from one another may be present within one molecule, wherein the acrylate and/or methacrylate copolymers have a number-average molecular weight Mn, determined by gel permeation chromatography in accordance with DIN 55672-1:2016-03 (eluent: THF; standard: PMMA), in the range of 500 to 20,000 g/mol, wherein the acrylate and/or methacrylate copolymers are those which have been produced without using dibenzoyl peroxide (BPO) as initiator, and wherein the isocyanates suitable as isocyanate components contain at least two isocyanate groups, wherein the blowing agents used are hydrocarbons selected from the group consisting of cyclo-, iso- and/or n-pentane, hydrofluorocarbons, perfluorinated compounds selected from the group consisting of perfluoropentane and perfluorohexane and/or perfluorohexane, hydrofluoroolefins or hydrohaloolefins, water, oxygen-containing compounds selected from the group consisting of methyl formate, acetone and/or dimethoxymethane, and/or chlorohydrocarbons selected from the group consisting of dichloromethane and/or 1,2-dichloroethane.

13. The composition according to claim 1, wherein the acrylate and/or methacrylate copolymers have a number-average molecular weight Mn, determined by gel permeation chromatography in accordance with DIN 55672-1: 2016-03 (eluent: THF: standard: PMMA), in the range of 1000 to 15 000 g/mol.

14. The composition according to claim 1, wherein the proportion by mass of the total amount of acrylate and/or methacrylate copolymers, based on 100 parts by mass of polyol component, is 1 to 4 pphp.

15. The composition according to claim 1, wherein Si-containing foam stabilizers, based on the total amount of foam stabilizers, are present to an extent of less than 5% by weight or wherein Si-containing foam stabilizers, based on the total amount of foam stabilizers, are present to an extent of more than 50% by weight.

16. The composition according to claim 1, wherein Si-containing foam stabilizers are not present.

17. The composition according to claim 16, wherein the only foam stabilizer in the compositions is said acrylate and/or methacrylate copolymers.

* * * * *